US009998180B2

(12) United States Patent
Bakker et al.

(10) Patent No.: US 9,998,180 B2
(45) Date of Patent: Jun. 12, 2018

(54) APPARATUSES AND RELATED METHODS FOR MODULATING POWER OF A WIRELESS POWER RECEIVER

(71) Applicant: Integrated Device Technology, Inc., San Jose, CA (US)

(72) Inventors: Anton Bakker, Morgan Hill, CA (US); Craig Lambert, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 572 days.

(21) Appl. No.: 13/801,953

(22) Filed: Mar. 13, 2013

(65) Prior Publication Data

US 2014/0265610 A1  Sep. 18, 2014

(51) Int. Cl.
*H02J 50/12* (2016.01)
*H04B 5/00* (2006.01)
(Continued)

(52) U.S. Cl.
CPC ....... *H04B 5/0037* (2013.01); *G05B 13/0205* (2013.01); *H02J 5/005* (2013.01);
(Continued)

(58) Field of Classification Search
CPC . H02J 7/025; H02J 5/005; H02J 17/00; H04B 5/0031; H04B 5/0037;
(Continued)

(56) References Cited

U.S. PATENT DOCUMENTS

| 4,953,068 A * | 8/1990 | Henze | H02M 3/33584 |
| | | | 363/127 |
| 2002/0172063 A1* | 11/2002 | Link | H02M 5/4585 |
| | | | 363/132 |

(Continued)

FOREIGN PATENT DOCUMENTS

JP    2010246292 A    10/2010

OTHER PUBLICATIONS

International Search Report and Written Opinion for PCT application No. PCT/US2014/025455, dated Aug. 14, 2014, 8 pages.
(Continued)

*Primary Examiner* — Hal Kaplan
*Assistant Examiner* — Thai Tran
(74) *Attorney, Agent, or Firm* — Haynes and Boone, LLP.

(57) ABSTRACT

A wireless power enabled apparatus may comprise a wireless power receiver that includes a receive coil configured to generate an AC signal responsive an electromagnetic field, a rectifier including a plurality of switches configured to receive the AC signal and generate an output power signal, and control logic configured to control the plurality of switches to cause the rectifier to modulate the output power signal. The control logic may be configured to control the plurality of switches within the rectifier to have an overlap delay that modulates at least one parameter of the wireless power receiver. A method of operating a receiver side of a wireless power transfer system comprises generating an output power signal including a rectified voltage and a
(Continued)

rectified current responsive to receiving a wireless power signal, and controlling a rectifier according to at least one mode including a power modulation mode modulating the output power signal.

18 Claims, 6 Drawing Sheets

(51) Int. Cl.
*H02J 7/02* (2016.01)
*H02J 5/00* (2016.01)
*H02J 17/00* (2006.01)
*H02M 7/219* (2006.01)
*G05B 13/02* (2006.01)
*H02J 50/60* (2016.01)

(52) U.S. Cl.
CPC .............. *H02J 7/025* (2013.01); *H02J 17/00* (2013.01); *H02J 50/12* (2016.02); *H02M 7/219* (2013.01); *H04B 5/0031* (2013.01); *H02J 50/60* (2016.02); *Y02B 70/1441* (2013.01)

(58) Field of Classification Search
CPC ...... H04B 5/0025–5/0093; B60L 5/005; B60L 11/182; B60L 11/1829–11/1831; Y02T 90/122; H01F 38/14; H01F 2038/143–2038/146; A61B 1/00029; A61N 1/3787
USPC .......................................... 307/104; 320/108
See application file for complete search history.

(56) References Cited

U.S. PATENT DOCUMENTS

| | | |
|---|---|---|
| 2004/0218406 A1 | 11/2004 | Jang et al. |
| 2009/0204170 A1* | 8/2009 | Hastings .............. A61N 1/0565 607/33 |
| 2011/0112611 A1* | 5/2011 | Aghassian ...................... 607/60 |
| 2011/0163713 A1 | 7/2011 | Wang et al. |
| 2011/0210620 A1 | 9/2011 | Shinoda et al. |
| 2011/0241436 A1* | 10/2011 | Furukawa ..................... 307/104 |
| 2011/0291489 A1 | 12/2011 | Tsai et al. |
| 2013/0257360 A1 | 10/2013 | Singh |
| 2013/0260676 A1 | 10/2013 | Singh |

OTHER PUBLICATIONS

Integrated Device Technology, Inc., "Industry's First Multi-Mode WPC Compliant Wireless Power Receiver IC", Product Datasheet, IDTP9020, pp. 1-27, © 2012 Integrated Device Technology, Inc.
Integrated Device Technology, "IDT Wireless Power Receiver", Product Brief, IDTP9020, 2 pages, Aug. 30, 2012.
Texas Instruments, "bq5105x Direct Charging Efficiency Comparison", Application Report, pp. 1-5, © 2012 Texas Instruments Incorporated, Oct. 2012.
Texas Instruments, "bq51050BEVM-764, Integrated Wireless Power Li-Ion Charger Receiver", User's Guide, pp. 1-25, © 2012 Texas Instruments Incorporated, Oct. 2012.
Texas Instruments, "High-Efficiency Qi v1.1-Compliant Wireless Power Receiver and Battery Charger", Product Brief, 4 pages, © 2012 Texas Instruments Incorporated, Jul. 2012.
U.S. Appl. No. 13/436,135, filed Mar. 30, 2012, entitled "Apparatus, System, and Method for Back-Channel Communication in an Inductive Wireless Power Transfer System" to Singh et al.
U.S. Appl. No. 13/434,658, filed Mar. 29, 2012, entitled "Apparatuses Having Different Modes of Operation for Inductive Wireless Power Transfer and Related Method" to Singh.

* cited by examiner

APPARATUSES AND RELATED METHODS FOR MODULATING POWER OF A WIRELESS POWER RECEIVER

FIELD

Embodiments of the present disclosure relate generally to wireless power transfer and, more particularly, to apparatuses and related method for power modulation for wireless power receivers.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled electromagnetic field. In wireless power transmission, power is transferred by transmitting an electromagnetic field through a transmit coil. On the receiver side, a receiver coil may couple with the transmit coil through the electromagnetic field, thus, receiving the transmitted power wirelessly. The distance between the transmitter and receiver coils, at which efficient power transfer can take place, is a function of the transmitted energy and the required efficiency. The coupling coefficient (k) is a function of the distance between the coils, the coil sizes, and materials. The power conversion efficiency (e.g., coupling factor, coupling quality) may be significantly improved if the coils are sized and operated at such a frequency that they are physically within the so-called "near-field zone" of each other.

BRIEF SUMMARY

Embodiments of the present disclosure include a wireless power enabled apparatus. The wireless power enabled apparatus comprises a wireless power receiver that includes a receive coil configured to generate an AC power signal responsive to an electromagnetic field, a rectifier including a plurality of switches configured to receive the AC power signal and generate a DC output power signal, and control logic configured to control the plurality of switches to cause the rectifier to modulate the DC output power signal.

Another embodiment of the present disclosure includes a wireless power enabled apparatus. The wireless power enabled apparatus comprises a wireless power receiver that includes a receive coil, a rectifier including a plurality of switches configured to receive a power signal generated from the receive coil and generate an output power signal in response thereto, and control logic configured to control the plurality of switches within the rectifier to have an overlap delay that modulates at least one parameter of the wireless power receiver.

Another embodiment of the present disclosure includes a method of operating a receiver side of a wireless power transfer system. The method comprises generating an output power signal including a rectified voltage and a rectified current responsive to receiving a wireless power signal, and controlling a rectifier according to at least one mode including a power modulation mode modulating the output power signal.

DETAILED DESCRIPTION

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Figure 1:
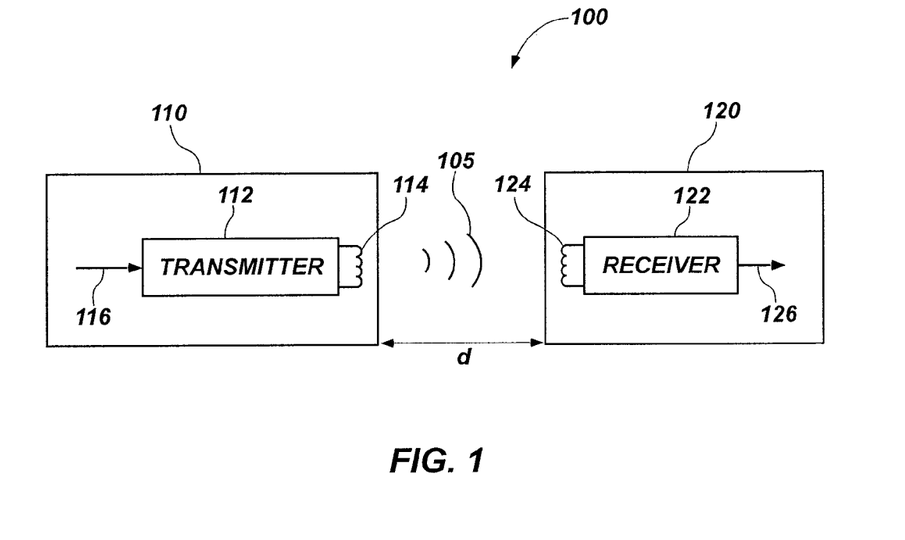
FIG. 1 is a schematic block diagram of a wireless power transfer system.

FIG. 1 is a schematic block diagram of a wireless power transfer system 100. The wireless power transfer system 100 includes a wireless power transmitting apparatus 110, and a wireless power receiving apparatus 120. The wireless power transmitting apparatus 110 includes a wireless power transmitter 112 having a transmit coil 114 configured to generate an electromagnetic field 105 for providing power transfer to the wireless power receiving apparatus 120. The wireless power receiving apparatus 120 includes a wireless power receiver 122 having a receive coil 124 configured to couple with the electromagnetic field 105. The transmit coil 114 and the receive coil 124 may be sized according to the particular devices and applications to be associated therewith. The electromagnetic field 105 may also be referred to as the wireless power signal 105 for power transfer from the wireless power transmitter 112 to the wireless power receiver 122.

An input signal 116 may be provided to the wireless power transmitter 112 for providing the wireless power transmitter 112 with the power for generating the wireless power signal 105 that provides a power transfer to the wireless power receiving apparatus 120. The wireless power receiver 122 may couple to the wireless power signal 105 and generates an output signal 126 in response thereto. The output signal 126 may provide the power that is used by the wireless power receiving apparatus 120 for storing (e.g., charging a battery), consumption (e.g., providing system power), or both.

The wireless power transmitter 112 and the wireless power receiver 122 are separated by a distance (d). In some embodiments, the wireless power transmitter 112 and the wireless power receiver 122 may be configured according to a mutual inductance relationship, such that when the resonant frequency of the wireless power receiver 122 and the resonant frequency of the wireless power transmitter 112 are substantially identical, transmission losses between the wireless power transmitter 112 and the wireless power receiver 122 are minimal. Likewise, the frequency of the wireless power signal 105 may be set by the wireless power transmitter 112 at or near the resonant frequencies of the coils 114, 124. As a result, an efficient power transfer occurs by coupling a large portion of the energy in the near-field of the transmit coil 114 to the receive coil 124 rather than propagating most of the energy in an electromagnetic wave to the far-field. If the wireless power receiving apparatus 120 is in the near-field (within some distance (d)), inductive coupling may occur between the transmit coil 114 and the receive coil 124. The area around the transmit coil 114 and receive coil 124 where this near-field inductive coupling may occur may be referred to as a "coupling region." Because of this mutual inductance relationship, the wireless power transfer may be referred to as inductive wireless power transfer.

The transmit coil 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power transmitting apparatus 110 may include a wireless power transmitter to transmit the wireless power signal 105. The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which wireless power signal 105 may be received. The wireless power receiving apparatus 120 may also be a less mobile electronic device, such as a television, personal computer, media player (e.g., DVD player, Blu-ray player, etc.) or any other device that may operate by, and/or store electrical power.

The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter.

Figure 2:
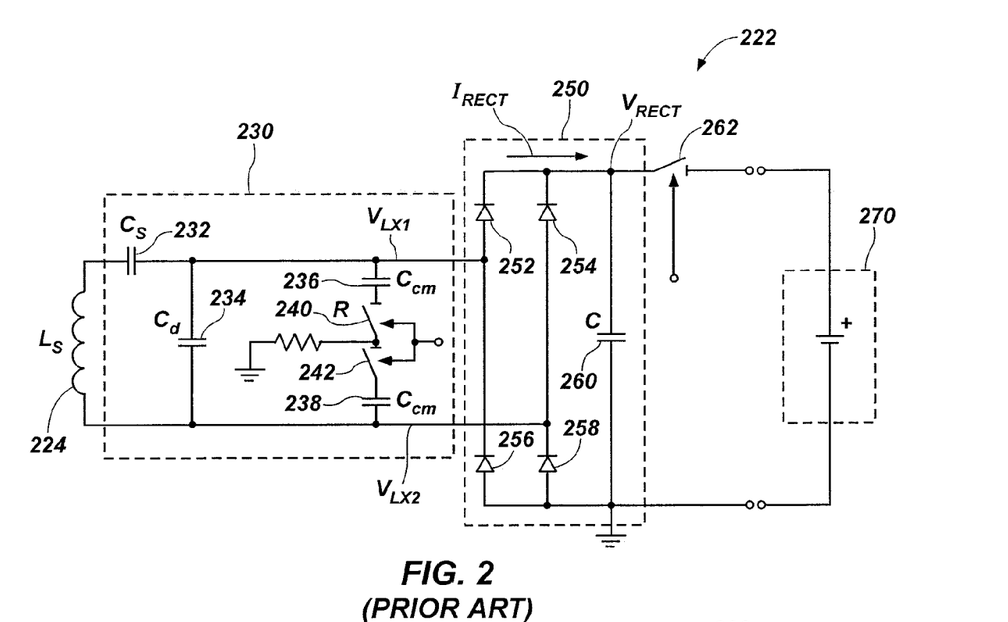
FIG. 2 is a schematic block diagram of a conventional wireless power receiver.

FIG. 2 is a schematic block diagram of a conventional wireless power receiver 222. The wireless power receiver 222 includes a receive coil 224, resonant capacitors 230, and a rectifier 250 that are configured to receive and convert the wireless power signal 105 (FIG. 1) to an output power signal that is provided to a load 270 (e.g., battery). The output power signal is a rectified output signal that includes a rectified current ($I_{RECT}$) and a rectified voltage ($V_{RECT}$). A switch 262 may be included to disconnect the load 270 from the wireless power receiver 222, if desired.

The resonant capacitors 230 may include a plurality of capacitors 232, 234, 236, 238 that are configured in an LC network with the receive coil 224, which LC network determines the resonant frequency of the wireless power receiver 222. The capacitors 236, 238 may be coupled parallel with the capacitor 234 and may be further coupled in series with a plurality of switches 240, 242 having a resistive shunt path to ground therebetween. The additional capacitors 236, 238 and switches 240, 242 function as a capacitive modulation circuit that may modulate (e.g., add) capacitance to the LC network. Conventional wireless power receivers 222 may control the switches 240, 242 to modulate the amount of power coupled to the LC network, which is detected by the wireless power transmitter 112 (FIG. 1). As a result, communication from the wireless power receiver 222 to the wireless power transmitter 112 may be enabled through modulation of the parallel capacitance of the receive coil 224 within the LC network of the wireless power receiver 222.

The rectifier 250 of conventional wireless power receivers 222 may be configured as an asynchronous rectifier that includes a plurality of diodes 252, 254, 256, 258. Some rectifiers may be configured as a synchronous rectifier that includes one or more switches (not shown) that are configured to operate in a manner that emulates ideal diodes. For example, the low-side diodes 256, 258 may be replaced by switches that are configured to emulate diodes. In other words, such switches are controlled to behave in the same way as would ideal diodes during wireless power transfer. In such configurations, the switches turn off and on in an alternating fashion as would ideal diodes, with the same timing. Thus, the rectifier 250 of FIG. 2 only shows diodes 252, 254, 256, 258 because either configuration would behave in essentially the same way during wireless power transfer. Thus, the diodes 252, 254, 256, 258 may also be simply referred to as "devices," with the understanding that they operate as diodes within the rectifier 250.

The rectified voltage ($V_{RECT}$) may be generated as a DC voltage signal. With conventional wireless power receivers 222, the rectified voltage ($V_{RECT}$) is dependent on the voltage on the receive coil 224, which may vary at times. For example, the voltages generated by the receive coil 224 in the presence of the wireless power signal 105 may have a range from 3V to 12V depending on the coupling quality or other factors. As a result, the rectified voltage ($V_{RECT}$) may have a wide range of voltages, with those voltages at the upper end of the range often being higher than desired for the load voltage ($V_L$). For example, a battery (e.g., Li-ion battery) may be configured for a maximum voltage of 4.3V to 4.4V. Therefore, when the rectified voltage ($V_{RECT}$) is above the maximum load voltage ($V_L$) power may be wasted, excess heat may be generated, among other issues. For example, if the rectified voltage ($V_{RECT}$) is greater than a safe voltage for the components of the system, certain electrical circuits within the wireless power receiver 222 may be damaged. As a result, the designer must select components (e.g., devices 252, 254, 256, 258) that have breakdown voltages that protect the other wireless power receiver 222 components from damaging voltages. However, the breakdown voltages may need to be high enough so that the rectified voltage ($V_{RECT}$) may still provide power to the load 270 at the higher levels generated by the receive coil 224 that are still lower than the voltage that would cause damage to the load 270.

For example, the conventional wireless power receivers 222 may include rectifiers 250 with devices 252, 254, 256, 258 (diodes and/or switches) having breakdown voltages that are around 16V to 20V. As a result, if the rectified voltage ($V_{RECT}$) exceeds the level of the breakdown voltage, the devices 252, 254, 256, 258 may breakdown causing a current path through the rectifier 250 rather than damaging the load 270. These breakdown voltages are conventionally set to be well above the desired load voltage level ($V_L$) so that power transfer still occurs for the intermediate voltage levels—even though the intermediate voltage levels may be less desirable. Otherwise, power generation may rarely occur if the breakdown voltages for the devices 252, 254, 256, 258 were selected to be lower levels. For example, if the voltage generated by the receive coil 224 causes the rectified voltage ($V_{RECT}$) to operate at 10V under the conventional approach, it may still be desirable to allow power transfer to the load 270 rather than entering a breakdown state, even though it is greater than the desired load voltage ($V_L$).

Figure 3:
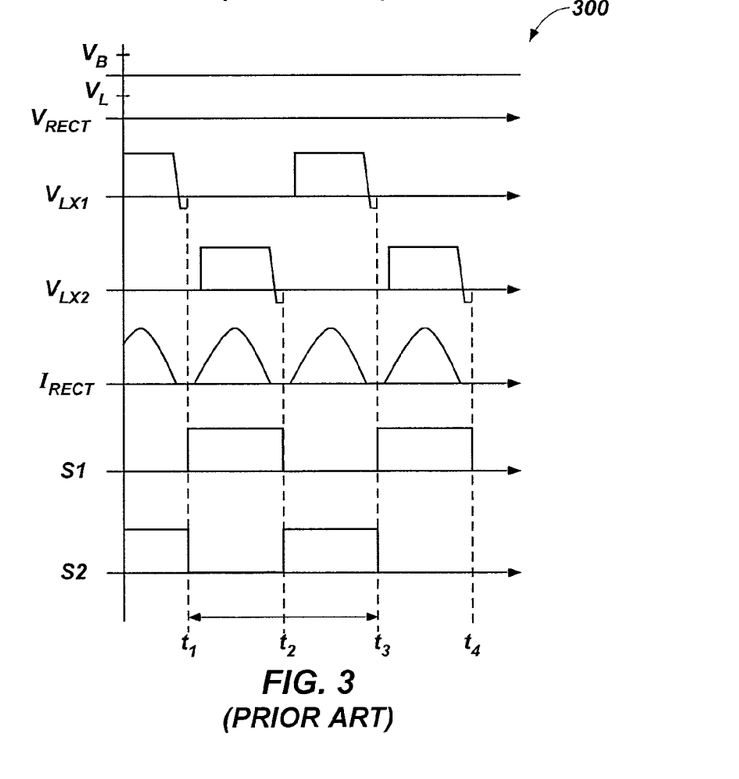
FIG. 3 is a timing diagram illustrating the operation of the conventional wireless power receiver of FIG. 2.

FIG. 3 is a timing diagram 300 illustrating the operation of the conventional wireless power receiver 222 of FIG. 2. As discussed above, some conventional wireless power receivers 222 may include asynchronous rectifiers that are configured with diodes, while others may include synchronous rectifiers that are configured with switches that are controlled to emulate ideal diodes. Such switches may receive control signals S1 and S2 that control the operation of the switches. Thus, control signals S1 and S2 are shown in FIG. 3 as an indication of when the device (whether it is a diode or a switch) of either conventional approach is conducting.

If the voltage ($V_{LX1}$) is positive, the second device 258 is conducting (indicated by S2 being high), and first device 256 is not conducting (indicated by S1 being low). If the voltage ($V_{LX1}$) goes negative (at time t1), the first device 256 begins conducting (indicated by S1 switching high) and the second device 258 simultaneously stops conducting (indicated by S2 switching low). Similarly, if the voltage ($V_{LX2}$) is positive, the first device 256 is conducting (indicated by S1 being high) and the second device 258 is not conducting (indicated by S2 being low). If the voltage ($V_{LX2}$) goes negative (at time t2), the second device 258 begins conducting (indicated by S2 switching high) and the first device 256 simultaneously stops conducting (indicated by S1 switching low). The devices 256, 258 continue to alternate in this manner during wireless power transfer (at times t3, t4, etc.).

As discussed above, the wireless power receiver 222 generates the rectified voltage ($V_{RECT}$) in a manner that is dependent on the voltage generated by the receive coil 224. For simplicity, the rectified voltage ($V_{RECT}$) is shown to have a constant voltage; however, it should be recognized that the rectified voltage ($V_{RECT}$) may fluctuate as the coupling quality between the wireless power transmitter 112 and the wireless power receiver 222 changes. As the voltage generated by the receive coil 224 increases, the rectified voltage ($V_{RECT}$) may also increase to the point where the rectified voltage ($V_{RECT}$) may be an overvoltage above a desired load voltage ($V_L$). As the voltage generated by the receive coil 224 continues to increase, the level of the overvoltage may also increase uncontrolled up until a breakdown voltage ($V_B$) is reached for the devices of the rectifier 250. As discussed above, the breakdown voltages ($V_B$) may be chosen to be relatively large (e.g., approximately 16V to 20V) so that the rectified voltage ($V_{RECT}$) does not trigger the breakdown voltage ($V_B$) too frequently if the rectified voltage ($V_{RECT}$) is often in an overvoltage state that is also below the level that might cause damage to components of the IC.

Embodiments of the disclosure may include apparatuses, systems, and methods for modulating an output power signal of a wireless power receiver. The embodiments shown and discussed herein are intended to demonstrate a wireless power enabled device and/or wireless power receiver that is configured to modulate the power generated by the wireless power receiver. For the following description, it should be recognized that the devices of a wireless power transfer system may include additional components to perform other features not specifically described herein or shown in the various figures. For example, the wireless power enabled device may include a modulator and/or a demodulator for communicating with other devices, foreign object detection modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to modulate the power generated by the wireless power receiver.

Figure 4:
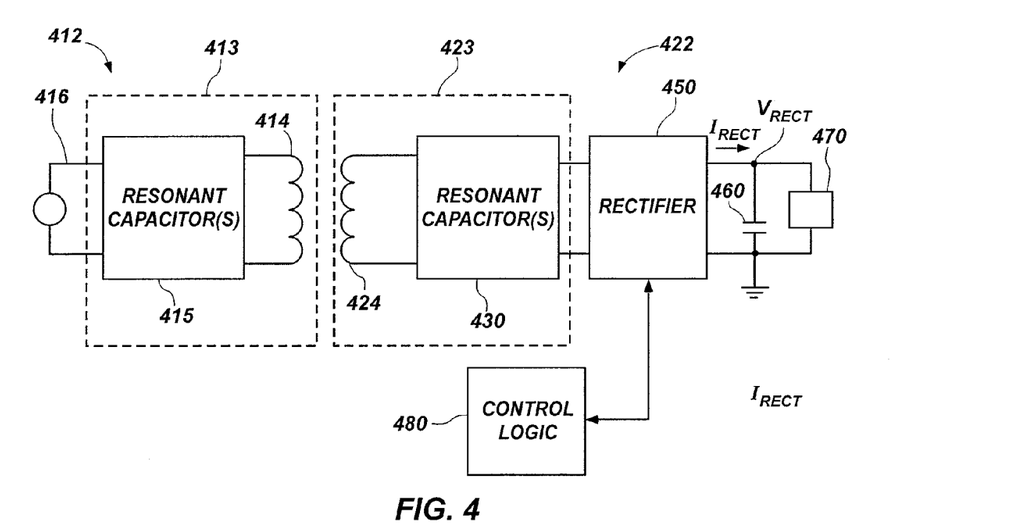
FIG. 4 is a schematic block diagram of a wireless power transfer system according to an embodiment of the present disclosure.

FIG. 4 is a schematic block diagram of a wireless power transfer system 400 according to an embodiment of the present disclosure. The wireless power transfer system 400 includes a wireless power transmitter 412 having resonant tank 413 that includes a transmit coil 114 coupled with resonant capacitors 415. The wireless power receiver 422 includes a resonant tank 423 having a receive coil 424 coupled with resonant capacitors 430. The resonant capacitors 430 are coupled with a rectifier 450. The wireless power transmitter 412 and the wireless power receiver 422 may be incorporated within a wireless power transmitting apparatus 110 (FIG. 1) and a wireless power receiving apparatus 120 (FIG. 1), respectively. The transmit coil 414 and the receive coil 424 (and other components) may be sized according to the particular devices and applications to be associated therewith.

The wireless power transmitter 412 may be configured to generate a wireless power signal 105 (FIG. 1) responsive to an input signal 416 received by the resonant tank 413. The wireless power receiver 422 may be configured to couple with the wireless power signal 150 (which induces an AC current in the receive coil 424) and generate an output power signal (a DC signal) to provide power to a load 470. As a result, the output power signal may include a rectified voltage ($V_{RECT}$) and rectified current ($I_{RECT}$) that is provided to the load 470. The load 470 may include an energy storage device (e.g., battery, such as a lithium-ion battery), system components of a wireless power enabled device, or a combination thereof. Thus, the output signal from the wireless power receiver 422 may be used for charging an energy storage device and/or for providing system power to the various system components of a device.

The wireless power transmitter 412 and wireless power receiver 422 may be generally configured as discussed above with respect to FIG. 1. The configurations of the LC networks within the resonant tanks 413, 423 may generally determine the resonant frequencies of the wireless power transmitter 412 and the wireless power receiver 422, respectively. For example, the resonant frequency of the resonant tanks 413, 423 may be based on the inductance of their respective inductive coil and the capacitance of the plates of the capacitors. The wireless power transmitter 412 and the wireless power receiver 422 may be configured according to a mutual inductance relationship, such that when the resonant frequency of the wireless power receiver 422 and the resonant frequency of the wireless power transmitter 412 are substantially identical, transmission losses between the wireless power transmitter 412 and the wireless power receiver 122 are minimal. As a result, the coupling efficiency and wireless power transfer may be improved. In addition, the frequency of the wireless power signal 105 may be set by the wireless power transmitter 412 at or near the resonant frequencies of the wireless power transmitter 412 and wireless power receiver 422 for minimal transmission losses.

The wireless power receiver 422 may further include control logic 480 operably coupled with the rectifier 450 to control the operation thereof. The control logic 480 may be implemented within a processor (e.g., microcontroller) or other circuitry that is configured (e.g., programmed) to perform various operations of embodiments of the present disclosure. The control logic 480 may further include computer-readable media (e.g., memory) storing computing instructions for execution by the processor related to performing processes of the embodiments of the present disclosure. Memory may include volatile and non-volatile memory.

In operation, the input signal 416 may cause an AC current flowing through the resonant tank 413 to generate a time-varying electromagnetic field for transmitting the wireless power signal 105. Thus, the wireless power signal 105 may be a time-varying signal that is substantially sinusoidal, having a frequency that may be based on the switching frequency of the wireless power transmitter 412. In some embodiments, the frequency of the wireless power signal 105 may be set to be approximately the resonant frequency of the resonant tank 413. In some embodiments, the frequency of the wireless power signal 105 may be set to differ from the resonant frequency of the resonant tank 413, such as to reduce the peak-to-peak current through the transmit coil 414.

In order to receive wireless power signal 105, the wireless power receiver 422 may be placed in the coupling region of the wireless power transmitter 412 such that inductive coupling may be achieved. As a result, the wireless power receiver 422 may receive the wireless power signal 105 and generate an AC power responsive thereto. In order for the power to be used by the load 470, the AC power may be converted to a DC power. The rectifier 450 may generate a rectified voltage ($V_{RECT}$) as well as a rectified current ($I_{RECT}$) flowing through the resonant tank 423. The rectifier 450 may be configured as a synchronous rectifier. As a result, the rectifier 450 may include one or more switches (see, e.g., FIGS. 5, 7, 8) that are controlled by the control logic 480 to be enabled and disabled in such a manner to generate the DC output power signal (i.e., rectified voltage ($V_{RECT}$) and rectified current ($I_{RECT}$)).

In addition, the control logic 480 may be configured to control the rectifier 450 to modulate the output power signal. Such modulation may cause the rectified voltage ($V_{RECT}$) to be controlled on the receiver side so that the rectified voltage ($V_{RECT}$) may be maintained below a desired level if the voltage generated by the receive coil 424 increases. In particular, the output power signal may be modulated by causing an overlap delay (Td) in the enablement of the switches of the rectifier 450. In other words, a plurality of switches in the rectifier 450 may be enabled for a period of time equal to the overlap delay (Td). Thus, modulation of the output power signal may occur through modulation of the overlap delay (Td). In addition, the output power signal may be modulated via modulation of the overlap delay (Td) in order to communicate data from the wireless power receiver 422 to the wireless power transmitter 412.

Figure 5:
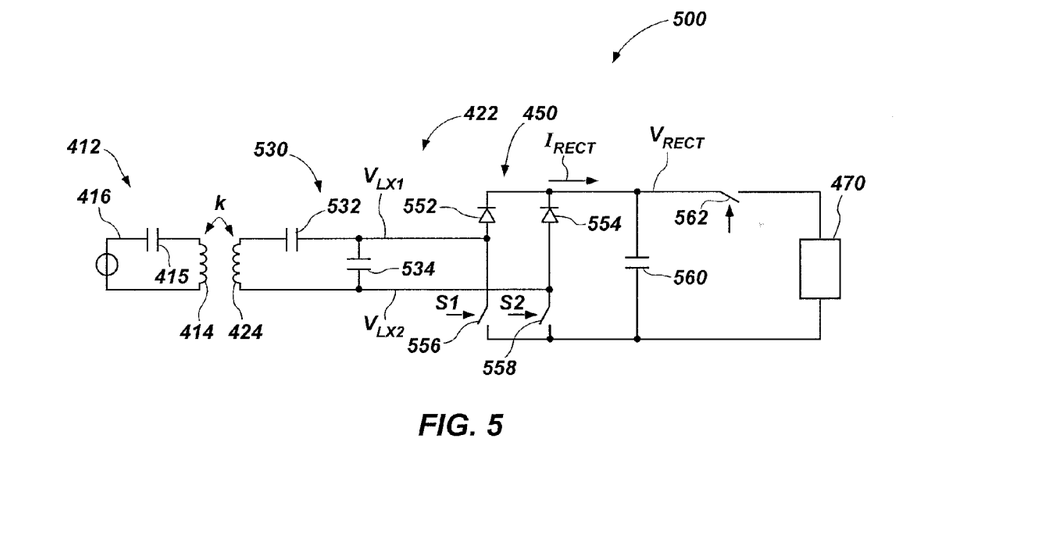
FIG. 5 is a simplified schematic diagram of a wireless power transfer system according to another embodiment of the present disclosure.

FIG. 5 is a simplified schematic diagram of a wireless power transfer system 500 according to another embodiment of the present disclosure. The wireless power transfer system 500 includes the wireless power transmitter 412 and the wireless power receiver 422. The wireless power transmitter includes the transmit coil 414 coupled to receive the input signal 416 through the resonant capacitor 415. The wireless power receiver 422 includes the receive coil 424, resonant capacitors 532, 534, and the rectifier 450 that are configured to receive and convert the wireless power signal 105 (FIG. 1) to an output power that is provided to the load 470 (e.g., battery). The output power is a rectified output signal that includes a rectified current ($I_{RECT}$) and a rectified voltage ($V_{RECT}$). A switch 562 may be included to disconnect the load 470 from the wireless power receiver 422, if desired.

As discussed above, the resonant capacitors 530 may include a plurality of resonant capacitors 532, 534 that are configured in an LC network with the receive coil 424, which LC network determines the resonant frequency of the wireless power receiver 422.

The rectifier 450 of conventional wireless power receivers 222 may be configured as a synchronous rectifier that includes a plurality of high-side diodes 552, 554 coupled with a plurality of low-side switches 556, 558. In some embodiments, the switches 556, 558 may be configured as field-effect transistors (FETs); however, other configurations and types of switches (e.g., bipolar) are also contemplated as embodiments of the present disclosure. The rectifier 450 is configured to receive a time-varying signal generated by the receive coil 424 and generate a DC voltage signal in response thereto. The rectifier 450 may be configured to modulate the output power signal in order to control the rectified voltage ($V_{RECT}$) on the receiver side rather than allowing the rectified voltage to depend on whatever voltage is generated by the receive coil 424. As a result, the rectified voltage ($V_{RECT}$) may have a reduced overvoltage in comparison with conventional methods that have rectifiers with devices operating as ideal diodes.

In operation, the wireless power receiver 422 may be configured to modulate the output power generated by the rectifier 450. In particular, the control logic 480 (FIG. 4) may be configured to generate the control signals S1, S2 to control the switches 556, 558 to modulate the output power from the rectifier 450. For example, the low-side switches 556, 558 may be enabled and disabled in a semi-alternating fashion similar to conventional methods. Embodiments of the present disclosure, however, may have different timing for the alternating transitions between the low-side switches 556, 558. For example, the low-side switches 556, 558 may be concurrently enabled for a period of time referred to herein as the overlap delay (Td). During the overlap delay (Td), the switches 556, 558 may cause a temporary short to the receive coil 434, which may cause the voltage across the receive coil 424 to be temporarily approximately zero. As a result, the rectified voltage ($V_{RECT}$) may be reduced.

In some situations, modulation of the output power may not be desired, and the low-side switches 556, 558 may be enabled and disabled in an alternating fashion as would ideal diodes, with the same timing. As a result, the rectifier 450 may be configured to operate in a plurality of different modes. In a first mode, the overvoltage (if any) of the rectified voltage ($V_{RECT}$) may be relatively low such that the rectified voltage ($V_{RECT}$) may not be desired to be reduced. As a result, the low-side switches 556, 558 may be controlled to operate as ideal diodes without modulation of the output power signal. In a second mode, however, the overvoltage of the rectified voltage ($V_{RECT}$) may begin to increase to a level that is (or will be) undesirable. As a result, the low-side switches 556, 558 may be controlled to operate with modulation of the output power signal, such as by increasing the overlap delay (Td). As a result, the temporary short for the period of the overlap delay (Td) may be generated, causing the voltage across the receive coil to be approximately zero, which may reduce the rectified voltage ($V_{RECT}$). A third mode may be a communication that is described more fully below.

Because the wireless power receiver 422 is able to control the level of the rectified voltage ($V_{RECT}$), the overvoltage of the rectified voltage ($V_{RECT}$) may reach as high of levels as with conventional wireless power receivers. Being able to control the rectified voltage ($V_{RECT}$) to remain below a predetermined threshold ($V_T$) during normal operation may allow designers to select devices that have breakdown voltages that are relatively lower than conventional devices. For example, rather than having breakdown voltages in the range of 16V to 20V, devices may be selected to have breakdown voltages in the 6V to 8V range. As a result, the die area of the wireless power receiver 422 may be reduced significantly.

The predetermined threshold ($V_T$) may be set below the breakdown voltage ($V_B$) as an overvoltage limit for the rectified voltage ($V_{RECT}$) to reach. As an example, a voltage of the wireless power receiver 422 may be monitored. If the voltage increases to a level that reaches the predetermined threshold ($V_T$), the overlap delay (Td) of the switches 556, 558 of the rectifier 450 may be increased. The overlap delay (Td) may continue to be increased until the monitored voltage begins to decrease and/or reaches an appropriate steady state. As a result, the overlap delay (Td) may remain at the current level or decreased, as desired. In some embodiments, a lower threshold may be used such that if the monitored voltage drops below the lower threshold, the overlap delay may be decreased (assuming that Td>0 and can be decreased), which may cause the rectified voltage ($V_{RECT}$) to increase. As a result, the rectified voltage ($V_{RECT}$) may be controlled to stay within an upper threshold voltage ($V_{T1}$) and a lower threshold voltage ($V_{T2}$). The voltage that is monitored may include the rectified voltage ($V_{RECT}$), the voltage across the receive coil 424, or other voltage that indicates a state of the output power signal.

Figure 6:
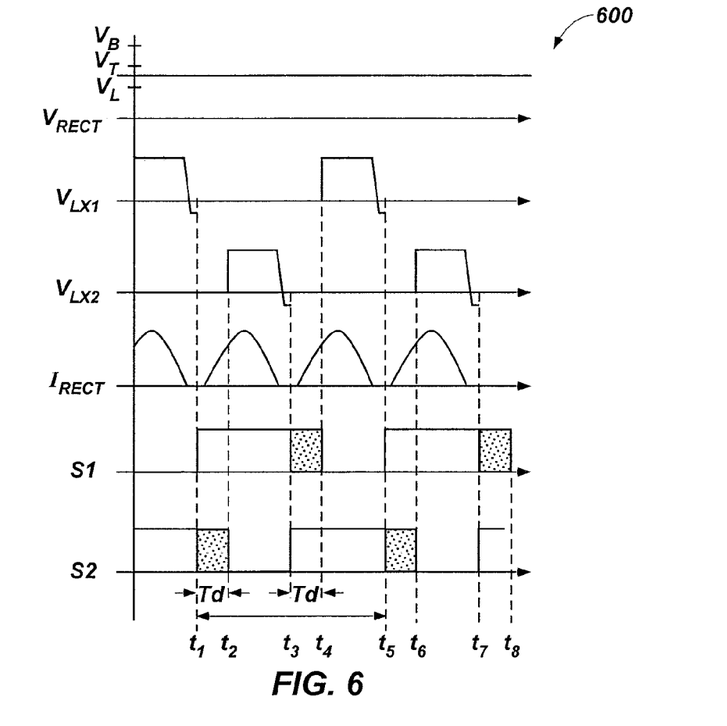
FIG. 6 is a timing diagram illustrating the operation of the wireless power receiver of FIG. 5 during wireless power transfer.

FIG. 6 is a timing diagram 600 illustrating the operation of the wireless power receiver 422 of FIG. 5 during wireless power transfer. As discussed above, the wireless power receiver 422 may include a synchronous rectifier that includes a plurality of switches 556, 558. The switches 556, 558 may receive control signals S1 and S2 (e.g., from control logic 480), respectively. Thus, the control signals S1 and S2 are shown in FIG. 3 as an indication of when the switches 556, 558 are enabled (i.e., conducting).

As discussed above, the switches 556, 558 under normal operation may be controlled to emulate ideal diodes. However, in embodiments of the present disclosure, the rectifier 450 may be configured to modulate the output power signal of the rectifier. For example, the rectifier 450 be controlled such that the switches 556, 558 may have an overlap delay (Td) (also represented by the shaded area) when both switches 556, 558 are enabled. As a result, during the overlap delay (Td) the voltage across the receive coil 424 may be shorted (e.g., approximately zero volts), which may cause the rectified current ($I_{RECT}$) to be zero during the overlap delay (Td) because current may not flow through the diodes 552, 554. As a result, the rectified voltage ($V_{RECT}$) may be reduced.

If the voltage ($V_{LX1}$) is positive, the second switch 558 is conducting (indicated by S2 being high), and first switch 556 is not conducting (indicated by S1 being low). If the voltage ($V_{LX1}$) goes negative (at time t1), the first switch 556 begins conducting (indicated by S1 switching high). Rather than the second switch 558 simultaneously stopping conducting, disabling the second switch 558 may be delayed for the duration of the overlap delay (Td). After the duration of the overlap delay (Td) has ended, the second switch 558 stops conducting (indicated by S2 switching low) (at time t2). As a result, the turnoff transition of the second switch 558 may be delayed for a duration of the overlap delay (Td).

Similarly, if the voltage ($V_{LX2}$) is positive, the first switch 556 is conducting (indicated by S1 being high) and the second switch 558 is not conducting (indicated by S2 being low). If the voltage ($V_{LX2}$) goes negative (at time t3), the second switch 558 begins conducting (indicated by S2 switching high). Rather than the first switch 556 simultaneously stopping conducting, disabling the second switch 558 may be delayed for the duration of the overlap delay (Td) (indicated by S1 switching low) (at time t4). As a result, the turnoff transition of the first switch 556 may be delayed for a duration of the overlap delay (Td). The switches 556, 558 continue to alternate in this manner during wireless power transfer (e.g., at times t5, t6, t7, t7, etc.). In some embodiments, both the first switch 556 and the second switch 558 may have their turnoff transitions delayed as shown in FIG. 6. In some embodiments, one of the first switch 556 and the second switch 558 may have its turnoff transition delayed. For example, the turnoff transition of the first switch 556 may be delayed resulting in an overlap delay (Td), while the turnoff transition of the second switch 558 may not be delayed, and vice versa.

As a result of the wireless power receiver 422 being configured to control the rectified voltage ($V_{RECT}$) through receiver-side power modulation, a designer may be able to select the devices of the wireless power receiver 422 (e.g., switches 556, 558 and diodes 552, 554) to have lower breakdown voltage than with conventional wireless power receivers. As a result of having devices with lower breakdown voltages, the die area for the wireless power receiver 422 may be reduced. In many wireless power receivers, the area of the devices of the rectifier may be as much as 30% to 50% of the total die area of the chip for the wireless power receiver. The die area is generally linearly dependent on the breakdown voltage. As a result, if devices are used that have a breakdown voltage of 7V instead of 16V, the die area of the switches may be reduced by a factor of approximately 2.3. If the die area of the switches is approximately 50% of the total die area of the chip, the total die area may, therefore, also be reduced by about 20%.

Figure 7:
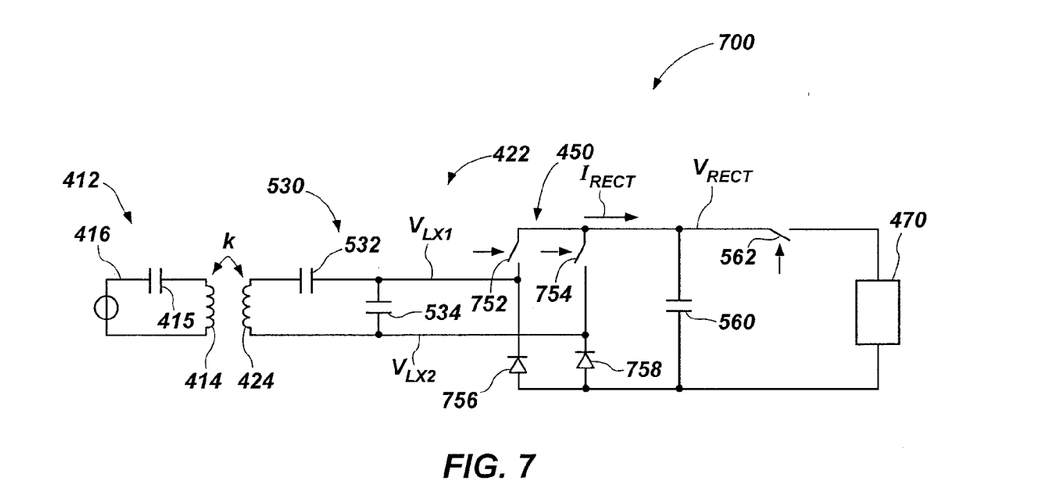
FIG. 7 is a simplified schematic diagram of a wireless power transfer system according to another embodiment of the present disclosure.

FIG. 7 is a simplified schematic diagram of a wireless power transfer system 700 according to another embodiment of the present disclosure. The wireless power transfer system 700 is configured generally similar to the wireless power transfer system 500 of FIG. 5. As a result, many of the common components retain the same reference numerals. The rectifier of FIG. 7, however, includes switches 752, 754 on the high side of the rectifier 450, and diodes 756 on the low side of the rectifier 450.

Figure 8:
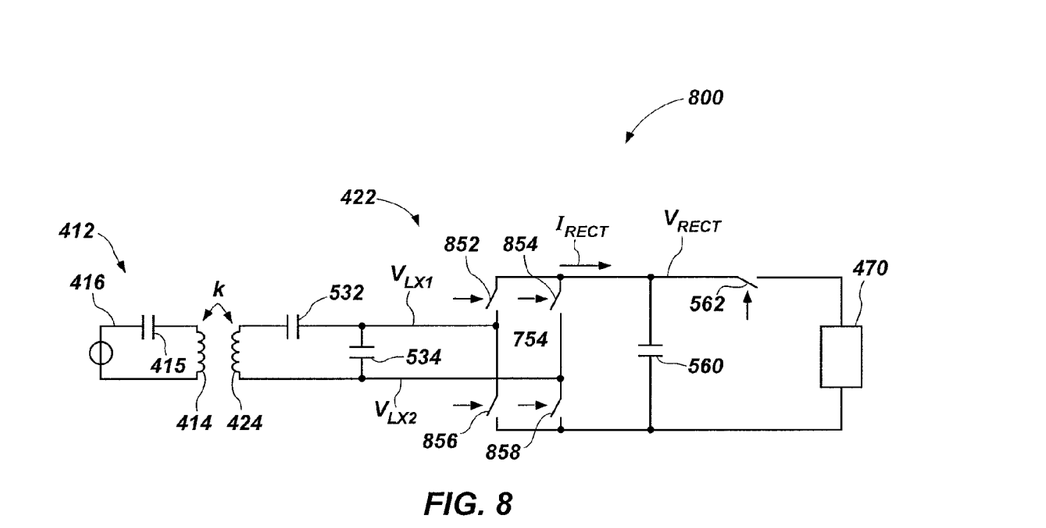
FIG. 8 is a simplified schematic diagram of a wireless power transfer system according to another embodiment of the present disclosure.

FIG. 8 is a simplified schematic diagram of a wireless power transfer system 800 according to another embodiment of the present disclosure. The wireless power transfer system 800 is configured generally similar to the wireless power transfer system 500 of FIG. 5. As a result, many of the common components retain the same reference numerals. The rectifier of FIG. 7, however, includes switches 852, 854, 856, 858 without any diodes. The switches 852 and 854 may be on the high side of the rectifier 450, and the switches 856, 858 may be on the low side of the rectifier 450.

Additional embodiments may include other combinations of switches and/or diodes, including those that have both switches and diodes on the high side and/or low side of the rectifier 450. In addition, other rectifier configurations are contemplated having more or fewer devices than the four shown.

Figure 9:
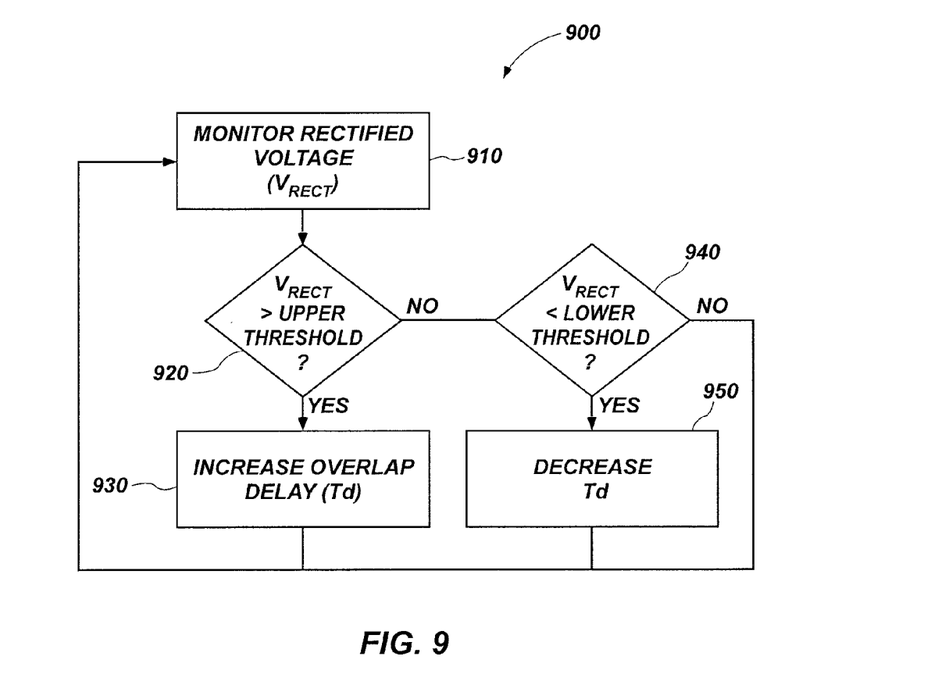
FIG. 9 is a flowchart illustrating a method for operating a wireless power receiver according to an embodiment of the present disclosure.

FIG. 9 is a flowchart 900 illustrating a method for operating a wireless power receiver according to an embodiment of the present disclosure. In particular, the wireless power receiver may be configured such that the rectifier includes switches that are controlled to have a overlap delay (Td).

At operation 910, the rectified voltage ($V_{RECT}$) may be monitored. At operation 920, if the rectified voltage ($V_{RECT}$) is greater than an upper threshold ($V_{T1}$), the overlap delay (Td) may be increased at operation 930. As a result, the receive coil 424 may be shorted, the rectified current ($I_{RECT}$) may be reduced to approximately zero as no current may flow through the diodes 552, 554. As a result, as the overlap delay (Td) is only temporary, the rectified voltage ($V_{RECT}$) may have an overvoltage state that is lower than conventional wireless power receivers. As a result, the devices of the wireless power receiver 422 may be selected to have breakdown voltages that are relatively smaller, which may reduce the die area over conventional solutions.

If the rectified voltage ($V_{RECT}$) is not greater than the upper threshold ($V_{T1}$), then the rectified voltage ($V_{RECT}$) may be compared with a lower threshold ($V_{T2}$) at operation 940. If the rectified voltage ($V_{RECT}$) is less than the lower threshold ($V_{T2}$), the overlap delay (Td) may be decreased at operation 950. As a result, the rectified voltage ($V_{RECT}$) may be maintained within an upper threshold ($V_{T1}$) and a lower threshold ($V_{T2}$).

In some embodiments, there may not be a lower threshold ($V_{T2}$), such that the overlap delay (Td) is only adjusted at the upper threshold ($V_{T2}$) is reached. For example, the overlap delay (Td) may be increased as the rectified voltage ($V_{RECT}$) goes above the upper threshold ($V_{T2}$), and subsequently decreased or maintained as the rectified voltage ($V_{RECT}$) goes below the upper threshold ($V_{RECT}$).

In some embodiments, the overlap delay (Td) may be reduced to the point that there is no longer an overlap delay (Td). As a result, the receive coil 424 (FIG. 4) may, at times, cause the rectified voltage ($V_{RECT}$) to be within the desired range without any overlap delay (Td). However, over time, the voltage generated by the receive coil 424 may begin to increase such that the rectified voltage ($V_{RECT}$) also increases. As the rectified voltage ($V_{RECT}$) approaches and/or passes the upper threshold, the overlap delay (Td) may be enabled and be adjusted as desired to maintain a desired rectified voltage ($V_{RECT}$).

In some embodiments, the overlap delay (Td) may be adjusted based on detection of a trend rather than a fixed threshold. For example, while monitoring the rectified voltage ($V_{RECT}$), the control logic 480 (FIG. 4) may detect that the rectified voltage ($V_{RECT}$) is trending upward at a certain rate. As a result, the overlap delay (Td) may be increased prior to the rectified voltage ($V_{RECT}$) reaching some fixed threshold. Similarly, the control logic may detect that the rectified voltage ($V_{RECT}$) is trending downward at a certain rate. As a result, the overlap delay (Td) may be increased prior to the rectified voltage ($V_{RECT}$) reaching some fixed threshold. Of course, control schemes are contemplated that adjust the overlap delay (Td) based on other factors, including those that include a combination of thresholds and trends.

In some embodiments, the overlap delay (Td) may include a fixed delay that is not adjusted, whereas in other embodiments, the overlap delay (Td) may change dynamically based on one or more fixed thresholds, dynamically set thresholds, or other criteria. For example, the microcontroller of the wireless power receiver 422 may receive an external command, receive an internal trigger signal, or have some other event-based reason for adjusting the overlap delay (Td) to lower the rectified voltage ($V_{RECT}$) or allow the rectified voltage ($V_{RECT}$) to increase.

Figure 10:
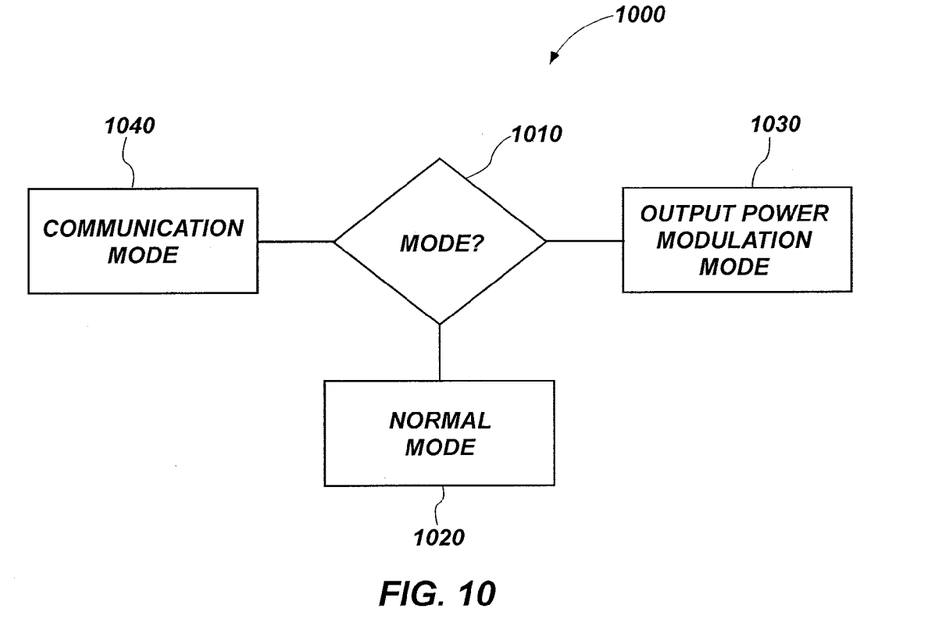
FIG. 10 shows a flowchart showing a plurality of modes in which the wireless power receiver may operate.

In some embodiments, the wireless power receiver 422 (FIG. 4) may include a mode controller (e.g., such as within the control logic 480) that is configured to control the operation of the rectifier 450 in one of a plurality of modes. For example, FIG. 10 shows a flowchart 1000 showing a plurality of modes in which the wireless power receiver may operate. At operation 1010 a mode may be selected. At operation 1020, in a first mode, the rectifier 450 may be controlled such that the switches 556, 558 may operate in a conventional manner similar to the timing diagram of FIG. 3. In other words, there is no overlap delay (Td) and the switches 556, 558 may emulate ideal diodes. At operation 1030, in a second mode, the rectifier may operate in a output power modulation mode similar to the timing diagram of FIG. 6. In other words, the overlap delay (Td) may be increased and/or decreased as desired, such that the output power signal may be modulated and the rectified voltage ($V_{RECT}$) set to a desired voltage level.

At operation 1040, in a third mode, the rectifier 450 may operate in a communication mode. The communication mode may operate generally similar to the output power modulation mode in that overlap delays (Td) of different durations may be used as a communication scheme. For example, when the receive coil 424 is temporarily shorted, the impedance of the receive coil 424 is also modulated with regard to what is detected by the wireless power transmitter 412. By modulating the overlap delay (Td), it appears to the wireless power transmitter 412 that the resonant frequency is changing (e.g., similar to adding capacitance through the capacitive-switch network of FIG. 2). As a result, data may be sent from the wireless power receiver 422 to the wireless power transmitter 412 via the modulation scheme. The wireless power transmitter 412 may distinguish between intended communication and modulation of the output power for purposes of wireless power transfer based on the switching frequency of the switches 556, 558. In addition, a communication byte may be interpreted by the wireless power transmitter 412 based on a data sequence (e.g., a start bit, stop bit, check sum error, etc.).

In addition to the die area that may be saved by using devices with lower breakdown voltages, additional die area may be saved by using the modulation of the overlap delay (Td) for communication from the wireless power receiver 422 to the wireless power transmitter 412. For example, the capacitor switch network of FIG. 2 may be eliminated in some embodiments, such that the capacitors 236, 238, switches 240, 242, and the shunt resistor may not be needed for communication to the wireless power transmitter 412.

In addition, communication from the wireless power receiver 422 to the wireless power transmitter 412 may be more reliable than conventional methods. Using the convention method described above with respect to FIG. 2, the parallel capacitance may be changed based on fixed values of the components of the wireless power receiver 422. By modulating the communication based on modulating the overlap delay (Td), the communication depth may change based on the signal strength and the amount of power being received.

In addition, in some situations when coupling quality between the wireless power transmitter 412 and the wireless power receiver 422 is relatively low, there is often not enough power to start charging or properly energize the load. Embodiments of the present disclosure may be enabled for the wireless power receiver 422 to start up from a relatively low voltage by boosting the rectified voltage ($V_{RECT}$) with the modulation scheme discussed herein. For example, if the voltage across the receive coil 412 is less than the rectified voltage ($V_{RECT}$), the rectified current ($I_{RECT}$) is zero. If, however, the overlap delay (Td) is modulated during the time that the voltage across the receive coil 412 is much less than the rectified voltage ($V_{RECT}$), there may be some rectified current ($I_{RECT}$) drawn. As a result, the ability to start the chip for the wireless power receiver 422 may be improved.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless power enabled apparatus, comprising:
   a wireless power receiver, including:
      a resonant tank configured to generate an AC power signal responsive to an electromagnetic field, wherein the AC power signal fluctuates among a range of voltages during operation, wherein a high end of the range is greater than or equal to 4 times a low end of the range;

a rectifier including a plurality of switches configured to receive the AC power signal and generate a DC output power signal at a rectified voltage level, wherein the plurality of switches enter a breakdown state when the rectified voltage level reaches a breakdown voltage level that is less than or equal to 1.6 times a desired voltage level; and control logic configured to monitor a voltage of the wireless power receiver, detect a trend in the monitored voltage, and select an overlap delay such that the plurality of switches are temporarily enabled at the same time, the overlap delay being selected based on the trend to maintain the rectified voltage level near the desired voltage level without exceeding the breakdown voltage level.

2. The wireless power enabled apparatus of claim 1, wherein when the monitored voltage is trending upward at a predetermined rate, a duration for the overlap delay is increased.

3. The wireless power enabled apparatus of claim 2, wherein the control logic is configured to increase the overlap delay prior to the rectified voltage level exceeding a threshold.

4. The wireless power enabled apparatus of claim 1, wherein the monitored voltage corresponds to the rectified voltage level.

5. The wireless power enabled apparatus of claim 1, wherein the control logic is configured to modulate a duration of the overlap delay for communicating data from the wireless power receiver to another device.

6. The wireless power enabled apparatus of claim 1, wherein the control logic is configured to control the plurality of switches to modulate the DC output power signal by temporarily shorting a receive coil of the wireless power receiver during wireless power transfer.

7. The wireless power enabled apparatus of claim 1, further comprising an electronic device including the wireless power receiver.

8. The wireless power enabled apparatus of claim 7, further comprising a load operably coupled with the wireless power receiver to receive the DC output power signal.

9. The wireless power enabled apparatus of claim 8, wherein the load includes at least one of a battery of the electronic device and system components of the electronic device.

10. The wireless power enabled apparatus of claim 1, wherein when the monitored voltage is trending downward at a predetermined rate, a duration for the overlap delay is decreased.

11. A wireless power enabled apparatus, comprising:
a wireless power receiver, including:
a receive coil;
a rectifier including a plurality of switches configured to receive a power signal generated from the receive coil and generate an output power signal at a rectified voltage level, wherein a voltage level of the power signal has a wide range based on a varying coupling quality of the wireless power receiver, and wherein the plurality of switches enter a breakdown state when the rectified voltage level reaches a breakdown voltage level that is less than or equal to 1.6 times a desired voltage level; and control logic configured to control the plurality of switches within the rectifier to have an overlap delay, the overlap delay being selected in response to detecting a trend in a monitored voltage level to maintain the rectified voltage level near the desired voltage level without exceeding the breakdown voltage level.

12. The wireless power enabled apparatus of claim 11, wherein the overlap delay further modulates at least one parameter of the wireless power receiver, the at least one parameter being selected from a group consisting of: the rectified voltage level; a current value of a rectified current of the output power signal; a voltage across the receive coil; and a resonant capacitance that is detected by a wireless power transmitter.

13. The wireless power enabled apparatus of claim 11, wherein the control logic is further configured to modulate the overlap delay for communicating data to a wireless power transmitter.

14. The wireless power enabled apparatus of claim 11, wherein the rectifier includes a plurality of low-side switches operably coupled to a plurality of high-side diodes, wherein the overlap delay is a duration where the plurality of low-side switches are simultaneously enabled.

15. A method of operating a receiver side of a wireless power transfer system, the method comprising:
generating an output power signal including a rectified voltage and a rectified current responsive to receiving a wireless power signal, the rectified voltage being generated from a power signal that varies among a range of values during operation, wherein a high end of the range is greater than a desired voltage of the output power signal;
monitoring the rectified voltage;
detecting a trend in the monitored rectified voltage; and
controlling a rectifier according to at least one mode including a power modulation mode modulating the output power signal to have an overlap delay such that a plurality of switches in the rectifier are temporarily enabled at the same time, the overlap delay being selected based on the detected trend to maintain the rectified voltage at less than or equal to 1.6 times the desired voltage to prevent the rectifier from entering a breakdown state.

16. The method of claim 15, wherein controlling the rectifier according to at least one mode further includes a normal mode wherein each of the plurality of switches within the rectifier are controlled as ideal diodes.

17. The method of claim 15, wherein controlling the rectifier according to at least one mode further includes a communication mode modulating a duration of the overlap delay of the plurality of switches within the rectifier to communicate data to another device at a different frequency as wireless power transfer.

18. The method of claim 15, wherein controlling the plurality of switches within the rectifier to have the overlap delay includes delaying a turnoff transition of at least one of the plurality of switches.

* * * * *